United States Patent [19]

Howell

[11] 4,301,703

[45] Nov. 24, 1981

[54] HIGH NOTE DATA GENERATOR

[75] Inventor: Stephen L. Howell, Huntingburg, Ind.

[73] Assignee: Kimball International, Inc., Jasper, Ind.

[21] Appl. No.: 139,882

[22] Filed: Apr. 14, 1980

[51] Int. Cl.³ ........................ G10H 1/22; H04Q 11/04

[52] U.S. Cl. ...................................... 84/1.01; 84/1.17; 84/DIG. 2; 328/137; 328/154; 340/825.50

[58] Field of Search ....................... 84/1.01, 1.03, 1.17, 84/DIG. 2; 328/137, 154; 340/147 LP

[56] References Cited

U.S. PATENT DOCUMENTS

| | | | |
|---|---|---|---|
| 3,990,339 | 11/1976 | Robinson et al. | 84/1.17 |
| 4,138,916 | 7/1979 | Kitagawa | 84/1.01 |
| 4,138,917 | 2/1979 | Sakashita et al. | 84/1.01 |
| 4,141,268 | 2/1979 | Kugisawa | 84/1.03 |
| 4,147,085 | 4/1979 | Robinson et al. | 84/1.17 |
| 4,170,768 | 10/1979 | Kitagawa | 84/1.01 X |
| 4,193,038 | 3/1980 | Kashio | 84/1.01 X |
| 4,194,425 | 3/1980 | Kitagawa | 84/1.01 X |
| 4,204,452 | 5/1980 | Uchiyama | 84/1.01 |

*Primary Examiner*—Stanley J. Witkowski
*Attorney, Agent, or Firm*—Albert L. Jeffers; John F. Hoffman

[57] ABSTRACT

A high note data generator for use in electronic musical instruments such as electronic organs, pianos, and the like, wherein the time division multiplexed serial data stream is received, and a single data pulse is generated in the time slot of the first occurring pulse in the data stream. In organs wherein the manual is scanned from high to low, this will be the highest note played, which is convenient from the standpoint of converting polyphonic data to monophonic data for certain organ voicing or for use in solo manual fill note generation. Alternatively, the system can be utilized for converting a pulse spanning more than one time slot into a pulse occupying only a single time slot, which is coincident with the leading edge of the first-mentioned pulse. The system comprises a first latch having its clocking input connected to the serial data stream and one of its outputs connected to an input of an AND gate. The other input of the AND gate is connected to the clock train, and the output of the AND gate is connected to the clocking input of a second latch, which has its output connected to a set input of the first latch. The first latch initiates the pulse at its output when the leading edge of the first occurring data pulse appears at the clocking input, and this first latch changes state when the output of the AND gate changes state, which is a function of the clock train rather than a function of the trailing edge of the data pulse. The high note data pulse appearing at the output of the first latch is, therefore, synchronized with the main data stream and occupies only a single time slot, regardless of the pulse width of the first occurring pulse.

10 Claims, 5 Drawing Figures

HIGH NOTE DATA GENERATOR

BACKGROUND OF THE INVENTION

The present invention relates to electronic keyboard musical instruments of the multiplexed variety, and in particular to a circuit for generating a single data pulse synchronized with the multiplexed data stream, wherein the generated pulse bears a predetermined relationship to the keydown pulses in the multiplexed data stream.

In most electronic organs in use today, both the solo and accompaniment manuals are adapted for polyphonic operation wherein tones corresponding to all depressed keys of the keyboard are simultaneously sounded. In multiplexed organs, this is accomplished by cyclically scanning the accompaniment and/or solo manuals and generating one or more time division multiplexed serial data streams comprising time slots corresponding on a one-to-one basis to the keys of the keyboard and wherein keydown pulses appear in time slots corresponding to depressed keys of the keyboards. Thus, if three keys on the solo keyboard are depressed, the serial data stream will comprise three keydown pulses in the time slots corresponding to these keys. The data stream is fed to the serial data input of the demultiplexer wherein the serial data is converted to parallel format, and the parallel data is utilized to actuate respective keyers for keying tones from the tone generation system to the output circuitry of the organ.

Although polyphonic operation is utilized in most cases, there are certain instances wherein monophonic operation is desirable. For example, when the tones selected by the solo manual are voiced in a manner to simulate brass instruments, such as trumpets and trombones, if the brass tones are played as chords, they often sound muddy and unclear. Accordingly, brass is normally played monophonically, with one key being depressed at a time. Since most music is written in polyphonic form for the solo manual, however, this would require the player to manually select a single note from each chord which is written for the solo manual. To accomplish this selection in an automatic fashion, prior art systems have been developed whereby either the keyboard or the data stream is prioritized such that the highest note, for example, of a played chord will be sounded and the other notes remaining silent even though the corresponding keys are depressed.

Another instance in which detection of the highest note played on the solo manual is desirable, is that of solo fill note generation. In systems of this type, such as that disclosed in U.S. Pat. No. 3,990,339, the first occurring pulse in the solo data stream, which is generated by scanning the solo manual from the highest note to the lowest note, is detected. This note is played together with certain notes of the chord played on the accompaniment manual but sounded in the octave immediately below the highest note played on the solo manual.

In prior art systems for either converting from polyphonic to monophonic operation on the solo manual or for selecting the highest note played for use in a fill note generation system, the first occurring pulse in the multiplexed data stream is merely selected or detected rather than a corresponding high note data pulse generated. One of the problems with this occurs in multiplexing systems wherein the keydown pulses have a pulse width which is equal to the entire width of the time slot. Thus, if two adjacent keys are played, the two keydown pulses will appear as a single, wide pulse rather than two individual pulses because the trailing edge of the first occurring pulse and the leading edge of the second pulse are substantially coincident. In the priority system of U.S. Pat. No. 4,055,103, for example, only the first occurring pulse is passed, but the system is dependent on the occurrence of the trailing edge of the pulse to lockout the remaining pulses in the data stream. If this system were utilized to generate or detect a pulse which spans more than one time slot, the entire pulse would be permitted to pass, rather than just a single pulse occupying only the time slot coincident with the leading edge of the pulse.

SUMMARY OF THE INVENTION

In order to overcome the disadvantages of the prior art high note detection systems, the present invention provides a system whereby the high note pulse is generated in a time slot coincident with the leading edge of the first occurring pulse in the multiplexed main data stream, and this pulse occupies only that time slot, regardless of the width of the first occurring pulse or the relationship of the first occurring pulse to the next pulse in the data stream.

This is advantageous in multiplexing systems wherein the keydown pulses have a pulse width which occupies the entire time slot so that the occurrence of pulses in two adjacent time slots appears as a single pulse due to the coincidence between the trailing edge of the first pulse and the leading edge of the second pulse. The system is also advantageous wherein it is desired to generate a single pulse synchronized with the multiplexed data stream dependent on the occurrence of a pulse having a pulse width which is much wider than a single time slot, as in the case of multiplex drive pulses, and pulses which are generated as a result in a change in state of the multiplexed data from one scan to the next. An important distinction between the present invention and the prior art is that the new pulse is actually generated, rather than a pulse merely being detected or passed as in the case of prior systems.

The present invention contemplates an electronic musical instrument having a keyboard with a plurality of playing keys, a clock for generating a train of clock pulses, a multiplexer for scanning the keyboard and generating a cyclically recurring time division multiplexed serial data stream comprising a plurality of time slots corresponding to the keys of the keyboard and a series of serial keydown pulses in respective time slots pertaining to depressed keys of the keyboard, and a preferential note pulse generator having an input to which is connected the serial data stream. The preferential note pulse generator detects the first occurring keydown pulse in the serial data stream and generates a cyclically recurring monophonic serial data stream on its output comprising a plurality of time slots synchronized with and temporally coextensive with the time slots of the first mentioned data stream and a single pulse, which is completely contained in the time slot of the monophonic data stream corresponding to the time slot of the first occurring keydown pulse in the first-mentioned data stream. The preferential note pulse generator is responsive only to the leading edge of the first occurring pulse and is independent of the trailing edge thereof.

More specifically, the preferential note pulse generator comprises a first latch having a data input at a first binary logic level, a set or reset input at the first binary logic level, an output connected to an output terminal, and a clocking input connected to the serial data line. A second latch includes a data input connected to the serial data line, a set or reset input connected to the latch command line, an output connected to the set or reset input of the first latch, and a clocking input which is connected to the output of an AND function gate. One input of the AND function gate is connected to the first latch output, and its second input is connected to the clock train. The preferential note pulse generator functions to initiate the generated pulse on the occurrence of the leading edge of the pulse which is detected, and terminates the generated pulse dependent on the polarity of the clock train.

It is an object of the present invention to provide a preferential note data generator which generates a pulse in a particular time slot of a time division multiplexed data stream dependent only on the occurrence of the leading edge of a detected pulse and independent of the effective pulse width of the detected pulse.

It is a further object of the present invention to provide a preferential note data generating system which is capable of easy integration into the existing circuitry of multiplexed electronic organs, and which is responsive to a wide variety of pulses and serial data stream formats.

DESCRIPTION OF THE PREFERRED EMBODIMENT

Figure 1:
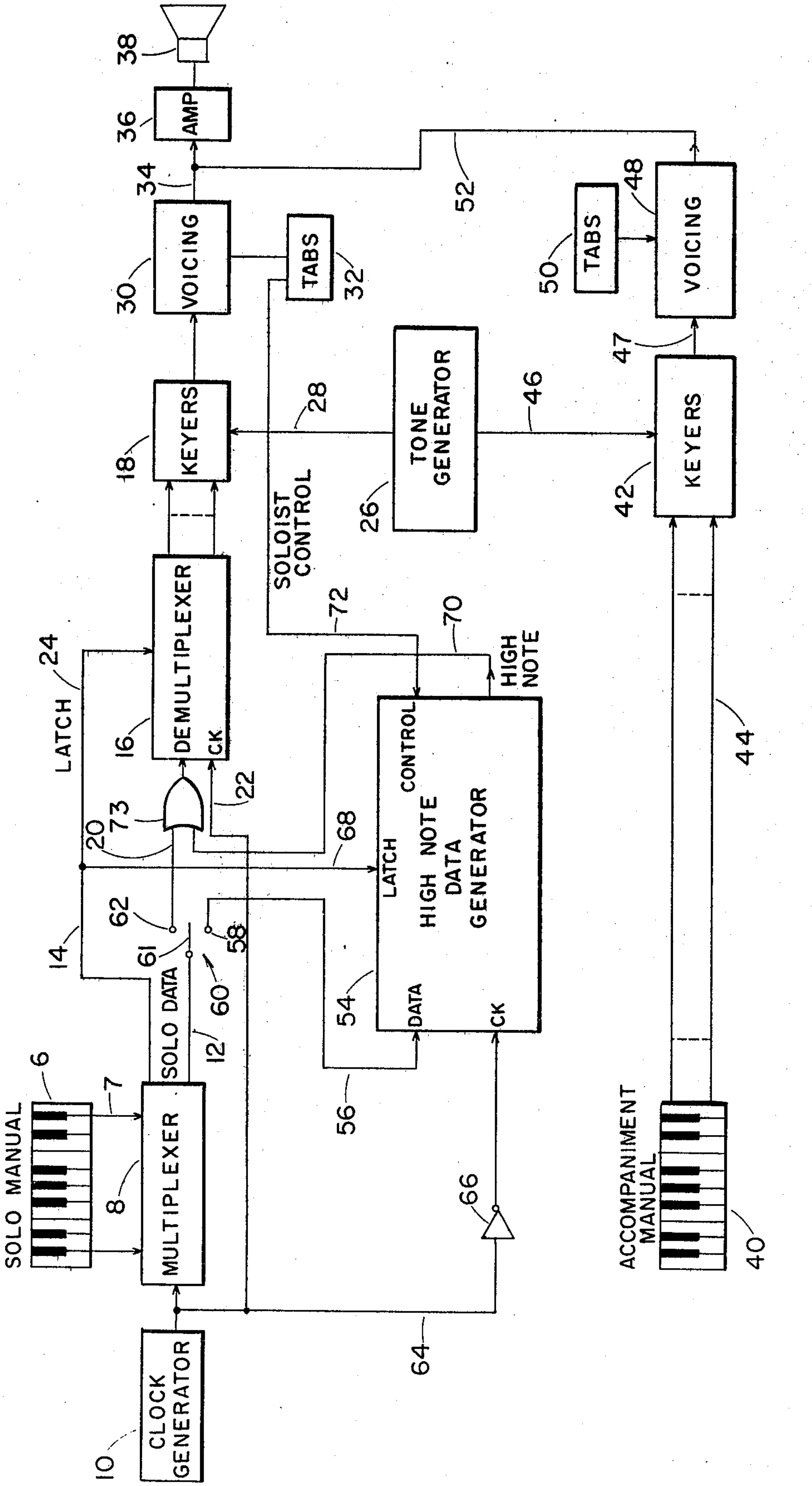
FIG. 1 is a block diagram of an electronic organ incorporating the high note data generator of the present invention.

Referring now to FIG. 1, solo manual 6 is connected by lines 7 to multiplexer 8, which is clocked by clock generator 10. Multiplexer 8, which may be any well-known prior art multiplexer, repetitively scans solo manual 6 and develops on line 12 a time division multiplexed serial data stream comprising a plurality of time slots corresponding on a one-to-one basis with the keys of keyboard 6 and having keydown pulses in time slots corresponding to depressed ones of the keys. During an interval between the end of one scan and the beginning of the next scan of manual 6, multiplexer 8 produces a latch command pulse on latch command line 14, which is utilized to latch the serial data out of demultiplexer 16 and into keyers 18.

Demultiplexer 16 is of conventional design and may comprise, for example, a shift register (not shown) to which the data stream is supplied over serial data line 20 and is progressively shifted therethrough by clock pulses on line 22, which is connected to clock generator 10. Respective latches (not shown) may be interposed between each stage of the shift register and a corresponding keyer 18, and the data in each stage of the shift register at the input of the respective latch is latched therein when the latch command pulse on line 24 is received. The data thus transferred from the shift register into the latches remains therein until the latches are again updated at the end of the next scan. An illustration of this type of demultiplexer is contained in U.S. Pat. No. 4,147,085.

Keyers 18 are connected to tone generator 26 over lines 28 and function to key tones from tone generator 26 to voicing circuits 30 in accordance with the demultiplexed data transmitted to keyers 18 by demultiplexer 16. Voicing circuits 30 are controlled by tabs 32, and, by filtering and tone combination techniques, produce on output 34 sounds which are simulative of various musical instruments, such as pipe organs, trumpets, violins, flutes, etc. The tones on line 34 are amplified by amplifier 36, the output of which connects to speaker 38.

The accompaniment manual 40, which is shown here as being of the non-multiplexed variety, is connected to accompaniment keyers 42 over lines 44, which correspond to the accompaniment keys on a one-to-one basis. Accompaniment keyers 42 are also fed with tones from tone generator 26 over lines 46, and provide outputs over lines 47 to voicing circuits 48, which are controlled by tabs 50. The outputs of voicing circuits 48 are connected to amplifier 36 over line 52. The electronic organ illustrated in FIG. 1 described thus far is completely conventional.

The high note data generator 54 according to the present invention has its serial data input connected to line 56, which in turn is connected to one of the contacts 58 of switch 60. Switch arm 61 is movable between contact 58 and contact 62 so as to connect the solo data on line 12 either directly to demultiplexer 16 over line 20 via OR gate 72 when it is in engagement with contact 62, or to connect the serial data to high note data generator 54 over line 56 when it is in engagement with contact 58. The clocking input of data generator 54 is connected to clock generator 10 over line 64 through inverter 66. The latch input is connected to latch command line 24 by line 68, and the high note data output is connected over line 70 to the input of demultiplexer 16 via OR gate 73. The control input is connected by soloist control line 72 to solo manual tabs 32.

High note data generator 54 detects the occurrence of the first pulse in the multiplexed data stream for each scan of solo manual 6, generates on line 70 a single pulse contained completely within the time slot of the first-occurring pulse on line 12, and locks out all remaining data in the scan. Since data generator 54 is clocked by the same clock generator 10 as clocks multiplexer 8, it is synchronized with multiplexer 8, and will be latched in synchronism therewith.

Although high note data generator 54 is shown as being connected in series between multiplexer 8 and demultiplexer 16 so that the serial data stream from multiplexer 8 is diverted thereto, other arrangements are possible. For example, multiplexer 8 could remain connected directly to demultiplexer 16 and at the same time connected to the data input of high note data generator.54. In this case, the output line 70 of data generator 54 would be connected to a separate demultiplexer-keyer system (not shown). Moreover, the present invention is not limited to high note data generator 54 receiving the main data stream from the multiplexer. It could be utilized to generate pulses synchronized with the main data stream in response to various other control pulses, such as multiplex drive pulses or data change pulses generated by the electronic organ. In most cases, these pulses span more than one time slot, and it is sometimes useful to generate single time slot control pulses in response to them. The system can also be used to widen narrow pulses to full width pulses.

Figure 2:
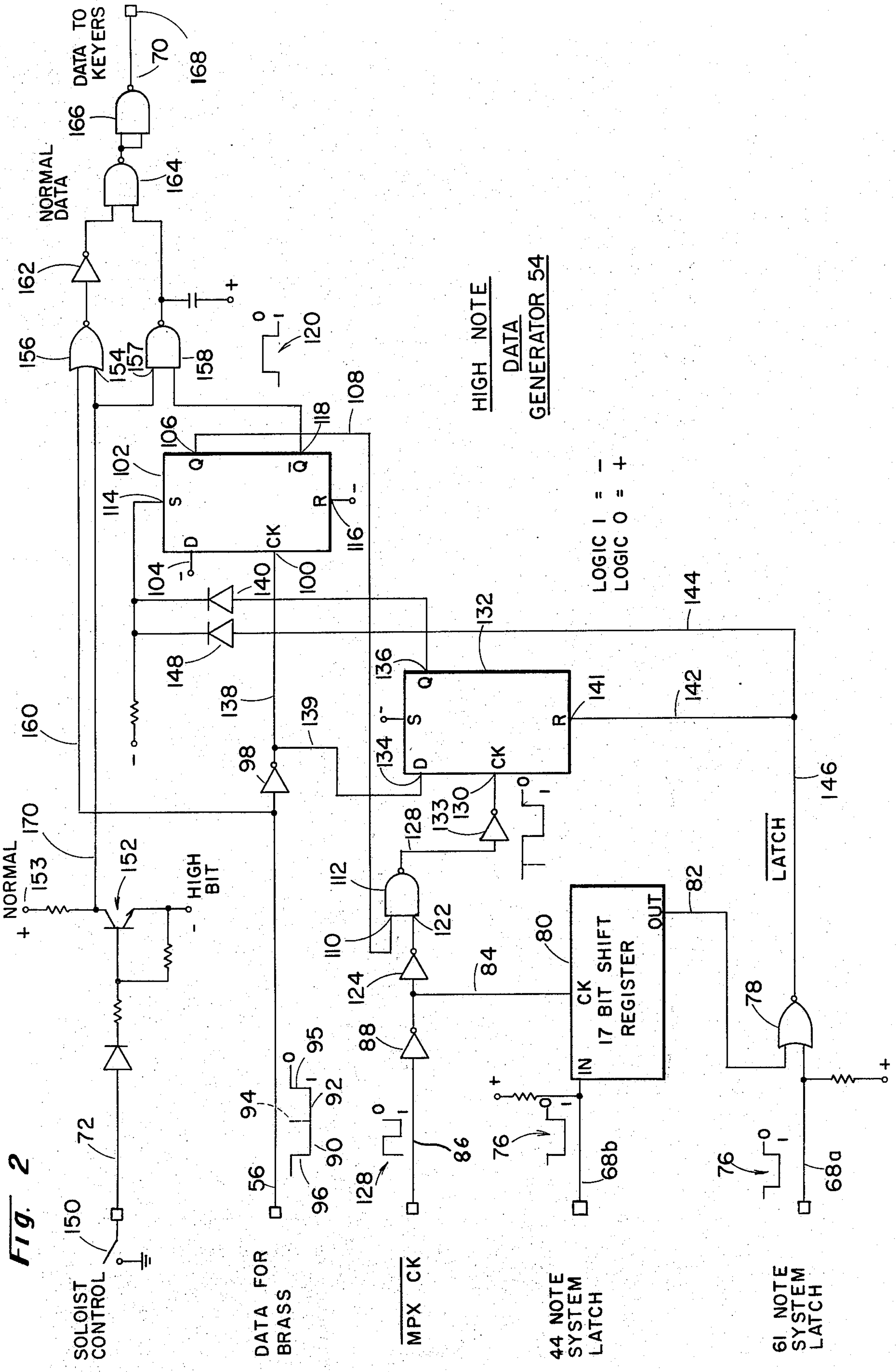
FIG. 2 is a detailed schematic of the high note data generator.

FIG. 2 illustrates, in negative logic, the preferred embodiment of high note data generator 54. In order to adapt data generator 54 for use in both forty-four note manual organs and sixty-one note manual organs, two separate latch command inputs 68*a* and 68*b* are provided. For sixty-one note manuals, the latch command pulse 76, which is a negative going pulse making the transition between positive five volts (logic 0) to negative nine volts (logic 1) between the end of one scan and the beginning of the next, comes in on line 68*a* and passes through NOR gate 78, at which point it is inverted and becomes the $\overline{\text{latch}}$ signal. In order to permit the system to function properly with a forty-four note manual, the latch pulse 76 on line 68*b* passes through a seventeen bit shift register 80 and appears on the output line 82 seventeen bits later, which is exactly the same time at which the latch command for a sixty-one note manual would occur. Shift register 80 is clocked by the multiplex clock train on line 84, which is the $\overline{\text{multiplex clock}}$ signal on line 86 inverted by inverter 88.

The solo serial data stream on line 56 has been illustrated by two adjacent pulses 90 and 92, which would occur if two adjacent keys of solo manual 6 were depressed. It will be noted that each of pulses 90 and 92 occupies the entire time slot so that the trailing edge of the first occurring pulse 90 is coincident in time with the leading edge of the next pulse 92 as indicated by dotted line 94. In this situation, pulses 90 and 92 appear as a single pulse having a leading edge 96 and a trailing edge 95, the entire width of which spans two adjacent time slots. It will be noted that pulses 90 and 92 are negative going and make a transition from logic level 0 to logic level 1 when their corresponding keys on keyboard 6 are depressed.

Pulses 90 and 92 are inverted by inverter 98 and connected to the clocking input 100 of D-type 4013 flip-flop 102, which functions in the present circuitry as a latch. Because latch 102 is a positive edge triggered latch, when the leading edge 96 of pulse 90 appears at clocking input 100, latch 102 will transfer the logic 1 level on its data input 104 to the Q output 106 connected by line 108 to one of the inputs 110 of NAND gate 112. At this point, the set input 114 and reset input 116 are connected to negative voltage logic 1 levels so that the logic 1 level will remain on Q output 106. The $\overline{Q}$ output 118 is the output on which the high note data pulse 120 appears, which is a positive going pulse making the transition from logic 1 to logic 0 as illustrated.

The $\overline{\text{clock}}$ pulse train on line 86 is connected to the second input 122 of NAND gate 112 through inverter 124. With reference to the timing diagrams illustrated in FIGS. 3 and 4, it will be noted that the leading edge 96 of the first occurring pulse 90 is delayed slightly from the leading edge 125 of clock train 126, the inversion 128 of which is illustrated in FIG. 2. This is because the data pulse 90 is triggered by the leading edge 125 of clock train 126 in the multiplexer 8 and will of necessity be delayed somewhat in time.

Figure 3:
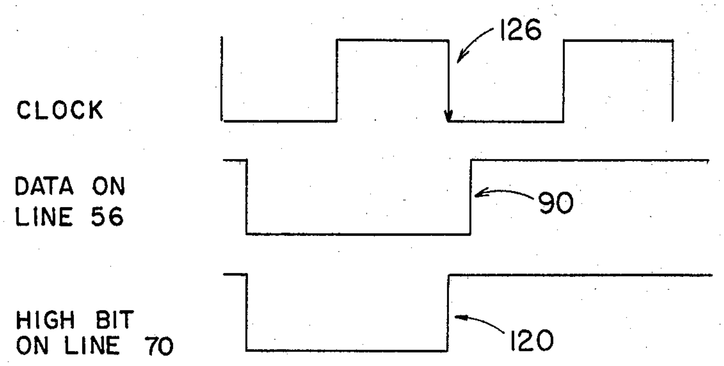
FIG. 3 is a timing diagram for a single data pulse situation.
Figure 4:
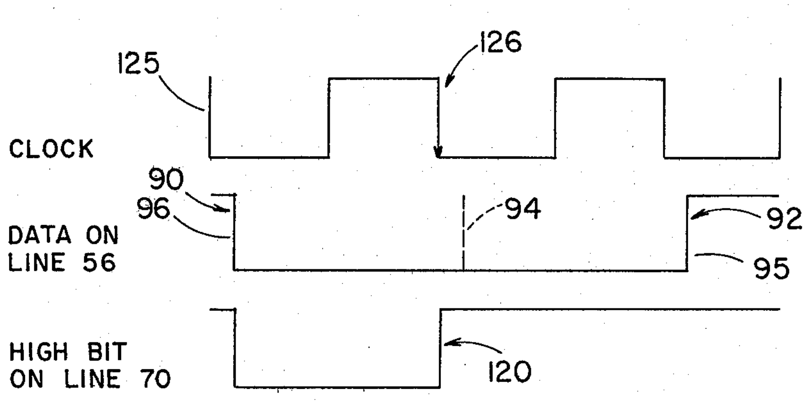
FIG. 4 is a timing diagram for data pulses in adjacent time slots.

At the time of the leading edge 125 of clock train 126, which is inverted at the input 122 of NAND gate 112, NAND gate 112 will be disabled because there is a logic 0 (positive voltage) at input 122. Before this time, data pulse 90 has not yet occurred so there will also be a logic 0 at the input 110 of NAND gate 112. After the positive going pulse on line 108 is received at input 110 of NAND gate 112 and the clock signal on 122 makes the negative going transition to a logic 1 level, NAND gate 112 will be enabled so that a logic 0 will appear on its output line 128 thereby producing a logic 1 on the clocking input 130 of D-type 4013 flip-flop 132 due to the action of inverter 133. Flip-flop 132, which functions as a latch in the present circuit, is positive edge triggered so that with its clocking input 130 at a logic level 1 (negative voltage) nothing occurs until the end of the next half cycle of clock train 126 at which time NAND gate 112 is again disabled thereby placing a logic 0 at the clocking input 130 of latch 132, which results in a positive going transition as illustrated in FIG. 2. This clocks latch 132 so as to transfer the logic level on its data input 134 to its Q output 136. It will be noted that the data input 134 is connected to the inverted data on line 138 by line 139 and, due to the fact that pulse 90 is delayed slightly from the clock train 126, as illustrated in FIGS. 3 and 4, a logic 0 will still be present on input 134. This logic 0, which is a positive voltage, will be transferred to the Q output 136, and will pass through diode 140 to the set input 114 of latch 102. This causes latch 102 to change states so that the Q output 106 makes a transition to a logic level 0, and the Q output makes the transition to a logic level 1 thereby terminating the high note data pulse 120.

At the same time, NAND gate 112 is disabled due to the setting of latch 102, which will remain set for the rest of the scan due to the fact that no further clocking data can appear at the clocking input 130 of latch 132. At the end of the scan, the $\overline{\text{latch}}$ signal from NOR gate 78, which is connected to the reset input 141 of latch 132 over line 142, will reset latch 132. This takes the set signal off latch 102, which enables latch 102 to again be clocked, thereby enabling NAND gate 112. Line 144 connects between the $\overline{\text{latch}}$ signal on line 146 and the set input 114 of latch 102 through diode 148 so as to place latch 102 in the set condition on power up. This prevents spurious signals from triggering latch 102 and causing false data on output 118.

With reference to FIG. 1, the serial data stream on line 12 is switched between demultiplexers 16 and high note data generator 54 by means of double pole switch 61. An alternative or additional means for switching the serial data is illustrated in FIG. 2 under the control of the soloist control switch 150, which is part of the tab system 32 illustrated in FIG. 1. With switch 150 open, transistor 152 is turned off and the positive voltage from terminal 153, which is a logic 0, is connected to the input 154 of NOR gate 156 and input 157 of NAND gate 158. This enables NOR gate 156 and disables NAND gate 158 thereby permitting the normal serial data on line 160 to pass through NOR gate 156. The normal data is inverted by inverter 162, and, since NAND gate 158 is disabled, its output is at logic 1, which enables NAND gate 164 thereby permitting the normal data to pass through it and through NAND gate 166, which is connected as an inverter to output terminal 168 over line 70.

When soloist control switch 150 is closed, transistor 152 will conduct thereby placing a logic 1 on line 170, which disables NOR gate 156 and enables NAND gate 158. With NAND gate 158 enabled, the $\overline{Q}$ output of latch 102, which is the high note data bit, can pass through NAND gate 158 to the input of NAND gate 164. The data then passes through enabled NAND gate 164 and inverter 166 to output terminal 168.

Although the logic has been described in terms of specific gates, appropriate equivalent gating could be utilized without altering the basic functioning of the circuitry. For example, NAND gate 112, in its broadest sense, is a logic device which performs an AND function, that is, the generating of a control output only when both of the inputs are at a specific logic level. Depending on the logic utilized, NAND gate 112 could be replaced by an AND gate, OR gate or NOR gate.

Figure 5:
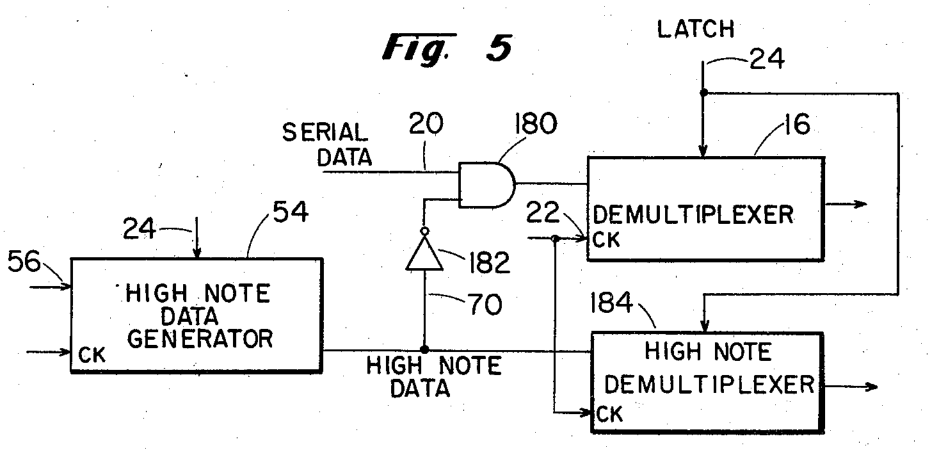
FIG. 5 is a modification of the block diagram of FIG. 1.

The high note data pulse on line 70 from data generator 54 could also be utilized to block the data pulse for the highest note played on serial data line 20 as, for example, when that note is to be separately demultiplexed in demultiplexer 184. As illustrated in FIG. 5, if AND gate 180 is connected between line 20 and demultiplexer 16, it can be disabled by the inverted high note data pulse from high note generator 54. The high data pulse is inverted by invertor 182 connected between line 70 and AND gate 180, and disables AND gate 180 so as to block serial data on line 20 for the duration of the inverted pulse from generator 54.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An electronic musical instrument comprising:
- a keyboard having a plurality of playing keys,
- clock means for generating a train of clock pulses,
- multiplexer means clocked by said clock means for scanning said keyboard and generating a cyclically recurring time division multiplexed serial data stream comprising a plurality of time slots corresponding to the keys of the keyboard and a series of keydown pulses in respective time slots pertaining to depressed keys of the keyboard,
- preferential note data generator means having an input and an output,
- means for connecting said data stream to the input of said preferential note data generator means,
- said preferential note data generator means detecting the first occurring keydown pulse in said serial data stream and generating a cyclically recurring monophonic serial data stream on its output comprising a plurality of time slots synchronized with and temporally coextensive with the time slots of said first mentioned data stream and a single pulse, said single pulse being completely contained in the time slot of said monophonic data stream corresponding to the time slot of said first occurring keydown pulse,
- said first occurring keydown pulse having a leading edge and a trailing edge, and
- said preferential note data generator means being responsive only to the leading edge of said first occurring pulse and independent of the trailing edge thereof.

2. The electronic musical instrument of claim 1 wherein said preferential note data generator means is clocked by said clock means, and said preferential note data generator means initiates said one pulse in response to the leading edge of said first occurring pulse and terminates said one pulse in response to the train of clock pulses.

3. An electronic musical instrument comprising:
- a keyboard having a plurality of playing keys,
- clock means for generating a train of clock pulses,
- multiplexer means clocked by said clock means for scanning said keyboard and generating a cyclically recurring time division multiplexed first serial data stream comprising a plurality of time slots corresponding to the keys of the keyboard,
- a preferential note data generator means clocked by said clock means and having an input and an output, said preferential note data generator means generating a cyclically recurring second serial data stream on its output comprising a plurality of time slots synchronized with and temporally coextensive with the time slots of said first mentioned data stream,
- said preferential note data generator means being responsive to the leading edge of a first pulse on its input to generate a second pulse in a time slot of said second data stream coinciding with the leading edge of said first pulse and having a duration independent of the duration of said first pulse, said second pulse being completely contained within said time slot coinciding with the leading edge of said first pulse.

4. An electronic musical instrument comprising:
- a keyboard having a plurality of playing keys,
- clock means for generating a train of clock pulses,
- multiplexer means clocked by said clock means for scanning said keyboard and generating a cyclically recurring time division multiplexed serial data stream comprising a plurality of time slots corresponding to the keys of the keyboard and a series of serial keydown pulses in respective time slots pertaining to depressed keys of the keyboard,
- a first latch means having an input connected to said serial data stream for initiating a pulse on an output of said latch means when the leading edge of said keydown pulse in the serial data stream appears on its input and for generating a control signal,
- AND function gate means generating an output signal on its output when said control signal and a predetermined polarity of said clock pulse train are on its respective inputs, and
- a second latch means having an input connected to said AND function gate means output and an output connected to a control input of said first latch means, said second latch means generating a control signal on its output in response to said output signal from said AND function gate means to cause said first latch means to change state thereby terminating the pulse on the output of said first latch means.

5. The electronic musical instrument of claim 4 wherein said first and second latch means are flip-flops and said input of said first latch means and said first input of said second latch means are clocking inputs.

6. The electronic musical instrument of claim 5 wherein said multiplexer means generates a latch command on a latch control line at the end of each scan of the keyboard, and said second latch means includes means connected to said latch control line to cause said second latch means to change state when the latch command is received thereby.

7. In an electronic musical instrument having a keyboard including a plurality of playing keys, clock means for generating a train of clock pulses, and multiplexer means clocked by said clock means for scanning said keyboard and producing on a serial data line a cyclically recurring time division multiplexed serial data stream comprising a plurality of time slots corresponding to the keys of the keyboard and a series of keydown pulses in respective time slots pertaining to depressed keys of the keyboard, said multiplexer means generating a latch command signal on a latch command line at the end of each scan of the keyboard, a preferential note data generator for producing on an output terminal a single pulse in a time slot corresponding to the time slot of the first occurring keydown pulse in said data stream, said data generator comprising:

a first latch having a data input at a first binary logic level, one of a set and reset input at said first binary logic level, an output means connected to said output terminal, and a clocking input connected to said serial data line, a second latch having a data input connected to said serial data line, one of a set and reset input connected to said latch command line, an output connected to said one of a set and reset input of said first latch, and a clocking input, and an AND function gate having a first input connected to said first latch output means, a second input connected to said clock means, and an output connected to the clocking input of said second latch.

8. The electronic musical instrument of claim 7 wherein said first and second latches are D-type flip-flops.

9. The electronic musical instrument of claim 7 including a data selector having a first input connected to said serial data line, a second input connected to said output terminal, and a control input connected to a player operated selector switch.

10. The electronic musical instrument of claim 7 wherein said AND function gate is a NAND gate.

* * * * *